United States Patent
Li et al.

(10) Patent No.: US 11,691,625 B2
(45) Date of Patent: Jul. 4, 2023

(54) DRIVING SCENE DETERMINING METHOD AND APPARATUS, COMPUTER, STORAGE MEDIUM, AND SYSTEM

(71) Applicant: CITIC Dicastal CO., LTD., Hebei (CN)

(72) Inventors: Minglei Li, Qinhuangdao (CN); Shiwen Xu, Qinhuangdao (CN); Yao Dai, Qinhuangdao (CN); Shaoqian Wang, Qinhuangdao (CN); Weidong Liu, Qinhuangdao (CN); Xi Li, Qinhuangdao (CN)

(73) Assignee: CITIC DICASTAL CO., LTD., Hebei (CN)

( * ) Notice: Subject to any disclaimer, the term of this patent is extended or adjusted under 35 U.S.C. 154(b) by 4 days.

(21) Appl. No.: 17/209,607

(22) Filed: Mar. 23, 2021

(65) Prior Publication Data
US 2021/0309226 A1    Oct. 7, 2021

(30) Foreign Application Priority Data
Apr. 3, 2020    (CN) .......................... 202010261357.0

(51) Int. Cl.
B60W 50/06    (2006.01)
G06V 20/56    (2022.01)
B60W 30/18    (2012.01)

(52) U.S. Cl.
CPC ...... *B60W 30/18109* (2013.01); *B60W 50/06* (2013.01); *G06V 20/56* (2022.01); *B60W 2420/52* (2013.01); *B60W 2510/0638* (2013.01)

(58) Field of Classification Search
CPC ........... B60W 30/18109; B60W 50/06; B60W 2420/52; B60W 2510/0638; B60W 2520/10; B60W 2555/20; B60W 2556/50; B60W 40/04; B60W 40/06; B60W 40/02; B60W 40/10; B60W 2050/0002; B60W 2420/40; G06V 20/56; G06V 40/20; G07C 5/0875; B60R 16/0231; B60Y 2400/30

See application file for complete search history.

(56) References Cited

U.S. PATENT DOCUMENTS

| 6,072,386 | A | 6/2000 | McGinlay |
| 6,384,834 | B1 * | 5/2002 | Watanabe ............... G06T 15/04 |
| | | | 345/581 |
| 8,903,602 | B2 * | 12/2014 | Bailie ................. B60C 23/0488 |
| | | | 701/36 |
| 9,959,792 | B2 * | 5/2018 | Singireddy .......... G06V 10/462 |
| 11,392,131 | B2 * | 7/2022 | Satzoda ................ B60W 40/09 |

(Continued)

FOREIGN PATENT DOCUMENTS

| CA | 2330003 A1 | 6/2002 |
| CN | 1937764 A | 3/2007 |

(Continued)

*Primary Examiner* — Peter D Nolan
*Assistant Examiner* — Anwar Mohamed
(74) *Attorney, Agent, or Firm* — Cooper Legal Group, LLC

(57) ABSTRACT

A method and apparatus for determining driving scene, and a vehicle are provided. The method includes: acquiring current driving data collected by a preset collection component; comparing the current driving data with a preset driving data threshold; and determining a current driving scene according to a comparison result between the current driving data and the threshold.

6 Claims, 6 Drawing Sheets

(56) References Cited

U.S. PATENT DOCUMENTS

| | | |
|---|---|---|
| 2006/0038831 A1 | 2/2006 | Gilbert |
| 2008/0055285 A1 | 3/2008 | Ishikawa |
| 2009/0224900 A1* | 9/2009 | Shimura ............ B60C 23/0408 340/447 |
| 2010/0100276 A1* | 4/2010 | Fujinawa ............ H04N 21/442 348/148 |
| 2010/0164841 A1 | 7/2010 | Huang |
| 2012/0029767 A1* | 2/2012 | Bailie ................ B60C 23/0416 701/36 |
| 2015/0279268 A1 | 10/2015 | Ganim et al. |
| 2018/0090039 A1* | 3/2018 | Singireddy ............ G09F 21/04 |
| 2019/0213931 A1 | 7/2019 | Brubaker |
| 2022/0009502 A1* | 1/2022 | Yokoyama ............ G06T 7/00 |

FOREIGN PATENT DOCUMENTS

| | | |
|---|---|---|
| CN | 103969466 A | 8/2014 |
| CN | 104112363 A | 10/2014 |
| CN | 107507544 A | 12/2017 |
| CN | 108665701 A | 10/2018 |
| CN | 110364097 A | 10/2019 |
| CN | 110379339 A | 10/2019 |
| CN | 110716776 A | 1/2020 |
| JP | 2003050558 A | 2/2003 |
| JP | 2004-240130 A | 8/2004 |
| JP | 2007101219 A | 4/2007 |
| JP | 2014-237383 A | 12/2014 |
| JP | 2014241115 A | 12/2014 |
| JP | 2015152664 A | 8/2015 |
| JP | 2016146136 A | 8/2016 |
| JP | 2016-221982 A | 12/2016 |
| JP | 2017100593 A | 6/2017 |
| JP | 2018-18128 A | 2/2018 |
| JP | 2019-46012 A | 3/2019 |
| JP | 2019-144066 A | 8/2019 |
| JP | 2019-156171 A | 9/2019 |
| JP | 2020-6819 A | 1/2020 |
| JP | 2020038318 A | 3/2020 |
| KR | 10-1061210 B1 | 9/2011 |
| KR | 1685611 B1 | 12/2016 |
| KR | 20200000530 U | 3/2020 |
| WO | 2016170786 A | 10/2016 |
| WO | 2019221067 A1 | 11/2019 |

* cited by examiner

DRIVING SCENE DETERMINING METHOD AND APPARATUS, COMPUTER, STORAGE MEDIUM, AND SYSTEM

CROSS-REFERENCE TO RELATED APPLICATION

The present application claims benefit of Chinese Patent Application No. 202010261357.0, filed on Apr. 3, 2020, the content of which are hereby incorporated by reference in its entirety.

BACKGROUND

With the development of economy, vehicles are gaining popularity, and users have increasing requirements on vehicle functions. Vesicles need to be not only safer, but also smarter.

SUMMARY

The present disclosure relates to information processing technology, in particular to a driving scene determining method and apparatus, and a vehicle.

In view of this, embodiments of the present disclosure are expected to achieve objective of providing a driving scene determining method and apparatus, a computer, a storage medium, and a system, by means of which a driving scene can be determined automatically, and a vehicle is smarter.

To achieve the above objective, technical solutions of the embodiments of the present disclosure are implemented as follows.

According to a first aspect of the disclosure, there is provided a driving scene determining method, the method including:

acquiring current driving data collected by a preset collection component;

comparing the current driving data with a preset driving data threshold; and determining a current driving scene according to a comparison result between the current driving data and the threshold.

In the above solution, acquiring the current driving data collected by the preset collection component may include:

acquiring current data of a light sensor on a vehicle.

In the above solution, acquiring the current driving data collected by the preset collection component may further include:

acquiring current data of a vehicle speed sensor on the vehicle.

In the above solution, acquiring the current driving data collected by the preset collection component may further include:

acquiring current data of a positioning device of the vehicle.

According to a second aspect of the disclosure, there is provided a driving scene determining apparatus, the apparatus including a processor; and multiple modules stored on a memory and executable by the processor, the multiple modules includes an acquisition module, a comparison module and a determination module, herein the acquisition module is configured to acquire current driving data collected by a preset collection component;

the comparison module is configured to compare the current driving data with a preset driving data threshold; and the determination module is configured to determine a current driving scene according to a comparison result between the current driving data and the threshold.

According to a third aspect of the disclosure, there is provided a vehicle including a wheel rotation imaging apparatus and a driving scene determining system, herein the wheel rotation imaging apparatus is electrically connected to the driving scene determining system;

the driving scene determining system includes a collection component and a processing component, herein the collection component is configured to collect current driving data of a vehicle;

the processing component is configured to acquire the driving data and determine a current driving scene according to the driving data; and the collection component includes a light sensor which is electrically connected to the processing component, the wheel rotation imaging apparatus works according to a driving scene determined by the driving scene determining system.

In the above solution, the collection component may further include a vehicle speed sensor which is electrically connected to the processing component.

The embodiments of the present disclosure provide the driving scene determining method and apparatus, the computer, the storage medium, and the system. The method includes: acquiring current driving data collected by a preset collection component; comparing the current driving data with the preset driving data threshold; and determining a current driving scene according to a comparison result between the current driving data and the threshold. By adopting the driving scene determining method and apparatus, the computer, the storage medium, and the system in the embodiments of the present invention, the driving scene can be determined automatically based on the current driving data collected by the collection component, to facilitate adaptive adjustment of a vehicle control system or an additional system.

Other beneficial effects of the embodiments of the present invention will be further described in specific implementations in conjunction with specific technical solutions.

DETAILED DESCRIPTION

An embodiment of the present disclosure provides a driving scene determining method, including:

acquiring current driving data collected by a preset collection component;

comparing the current driving data with a preset driving data threshold; and determining a current driving scene according to a comparison result between the current driving data and the threshold.

By adopting the driving scene determining method and apparatus, a computer, a storage medium, and a system in embodiments of the present disclosure, a driving scene can be determined based on current driving data collected by a collection component, to facilitate adaptive adjustment of a vehicle control system or an additional system.

The present disclosure is further described below in conjunction with the drawings and specific embodiments. It should be understood that the specific embodiments described herein are only used for explaining the present disclosure, rather than limiting the present disclosure.

First Embodiment

Figure 1:
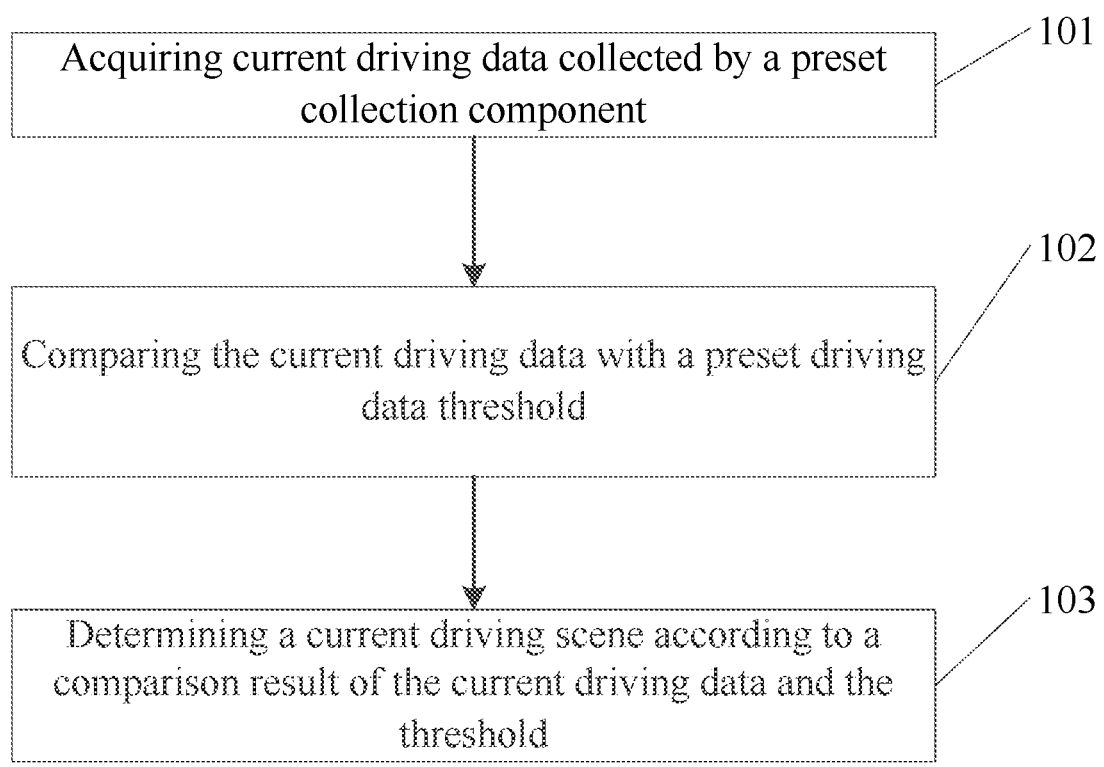
FIG. 1 is a flow diagram of a driving scene determining method provided by an embodiment of the present disclosure.

The first embodiment provides a driving scene determining method. The method may be implemented by a computer. The computer may be a cloud server, and may also be a local processing apparatus, such as a trip computer. As shown in FIG. 1, the method includes:

At block 101: acquiring current driving data collected by a preset collection component;

At block 102: comparing the current driving data with a preset driving data threshold; and At block 103: determining a current driving scene according to a comparison result between the current driving data and the threshold.

In some other embodiments of the present disclosure, in the block 101, acquiring the current driving data collected by the preset collection component includes:

acquiring current data of a light sensor on a vehicle, so as to determine whether the current driving scene is at daytime or nighttime, or whether it is sunny or cloudy, etc., which is a better implementation.

In some other embodiments of the present disclosure, in the block 101, acquiring the current driving data collected by the preset collection component further includes:

acquiring current data of a vehicle speed sensor on the vehicle so as to determine whether the current driving scene is in jammed traffic or smooth traffic, or determine whether it is on an urban road or an expressway, etc., which is a better implementation.

In some other embodiments of the present disclosure, in the block 101, acquiring the current driving data collected by the preset collection component further includes:

acquiring current data of a positioning device of the vehicle so as to determine whether the current driving scene is in an urban area or in a suburban area, which is a better implementation. Specifically, the positioning device may be a global positioning system (GPS), and may also be other similar positioning system, such as Beidou navigation satellite system.

Specifically, in the block 102, to accurately determine the driving scene, some thresholds need to be preset. The data exceeding a threshold indicates one type of driving scene, and the data lower than the threshold indicates another type of driving scene.

Further, multiple thresholds may also be set in different stages. In this way, multiple types of driving scenes may be preset. For example, one threshold is set for the vehicle speed sensor, and can divide a speed in the driving scene into a low speed and a high speed. Two thresholds are set for the vehicle speed sensor and can divide the speed in the driving scene into a low speed, a medium speed and a high speed. Four thresholds are set for the vehicle speed sensor and can divide the speed in the driving scene into a low speed, a medium-low speed, a medium speed, a medium-high speed, and a high speed. More thresholds may also be set, which will not be described in detail.

Specifically, in the block 103, the current driving scene may be determined based on data of a single collection component, for example, a low speed or a high speed may be determined according to the vehicle speed sensor as described above, or whether the driving scene is in jammed traffic or smooth traffic may be determined.

The driving scene can also be comprehensively determined according to data of multiple collection components. For example, driving scenes that can be determined according to data of the light sensor and the vehicle speed sensor include: jammed traffic at daytime, smooth traffic at daytime, jammed traffic at nighttime, and smooth traffic at nighttime. If more thresholds are set, more driving scenes can be determined.

For another example, driving scenes that can be determined according to the light sensor, the vehicle speed sensor and the positioning device include: jammed traffic in an urban area at daytime, smooth traffic in an urban area at daytime, jammed traffic in a suburban area at daytime, smooth traffic in a suburban area at daytime, jammed traffic in an urban area at nighttime, smooth traffic in an urban area at nighttime, jammed traffic in a suburban area at nighttime, and smooth traffic in a suburban area at nighttime. If more thresholds are set, more driving scenes can be determined.

Further, if there are more collection components, more driving scenes can be determined.

In addition, the driving scene determining method of the embodiment of the present disclosure may also be combined with a wheel rotation imaging system. The wheel rotation imaging system uses a technology that can display video in real time during wheel rotation, can be an advertising carrier or can be used for other purposes. However, the implementation of the wheel rotation imaging system requires a certain vehicle speed range and a certain light range, and may be unavailable if the vehicle speed is too slow or too fast and if the light is too bright. The vehicle speed and other scenes can just be monitored in real time in the embodiment, so the driving scene determining method and the wheel rotating imaging system can be combined. That is, if the driving scene determining method of the embodiment determines that the driving scene is at nighttime or it is cloudy, and the vehicle speed is not too fast, a set video can be automatically played without manual operation. Meanwhile, the wheel rotation imaging system needs to be charged, and the timing of charging can also be determined according to the driving scene determining method. For example, wheel rotation imaging system can be charged when the vehicle is traveling, and cannot be charged when the vehicle is stationary.

For further understanding, a more specific example is provided below.

Figure 2:
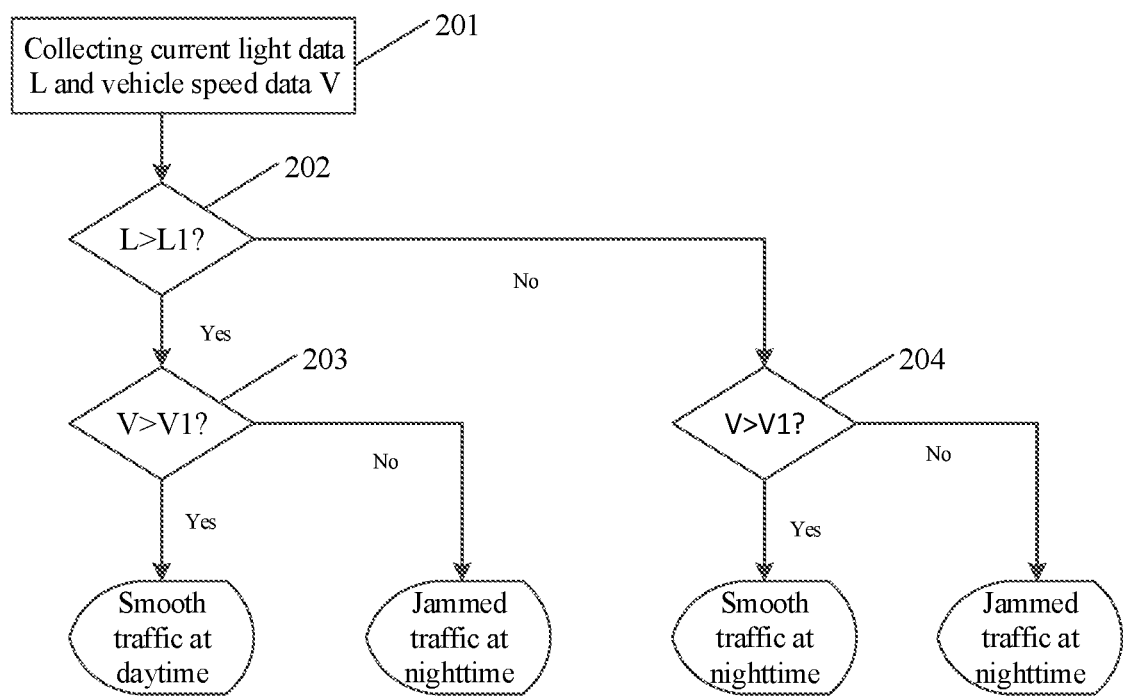
FIG. 2 is a first specific flow diagram for automatically determining a driving scene of a vehicle provided by an embodiment of the present disclosure.

According to a first Example: as shown in FIG. 2, a specific process for automatically determining the driving scene of the vehicle includes the following operations:

At block 201: collecting current light data L and vehicle speed data V;

At block 202: L>L1? i.e., determining whether the current light data is greater than a light threshold; if yes, indicating it is at daytime, and proceeding to block 203, otherwise, indicating it is at nighttime, and proceeding to block 204;

At block 203: V>V1? i.e., determining whether the current vehicle speed data is greater than a vehicle speed threshold; if yes, indicating smooth traffic at daytime, otherwise, indicating jammed traffic at daytime;

At block 204: V>V1? i.e., determining whether the current vehicle speed data is greater than the vehicle speed threshold, if yes, indicating smooth traffic at nighttime, otherwise, indicating jammed traffic at nighttime.

Figure 3:
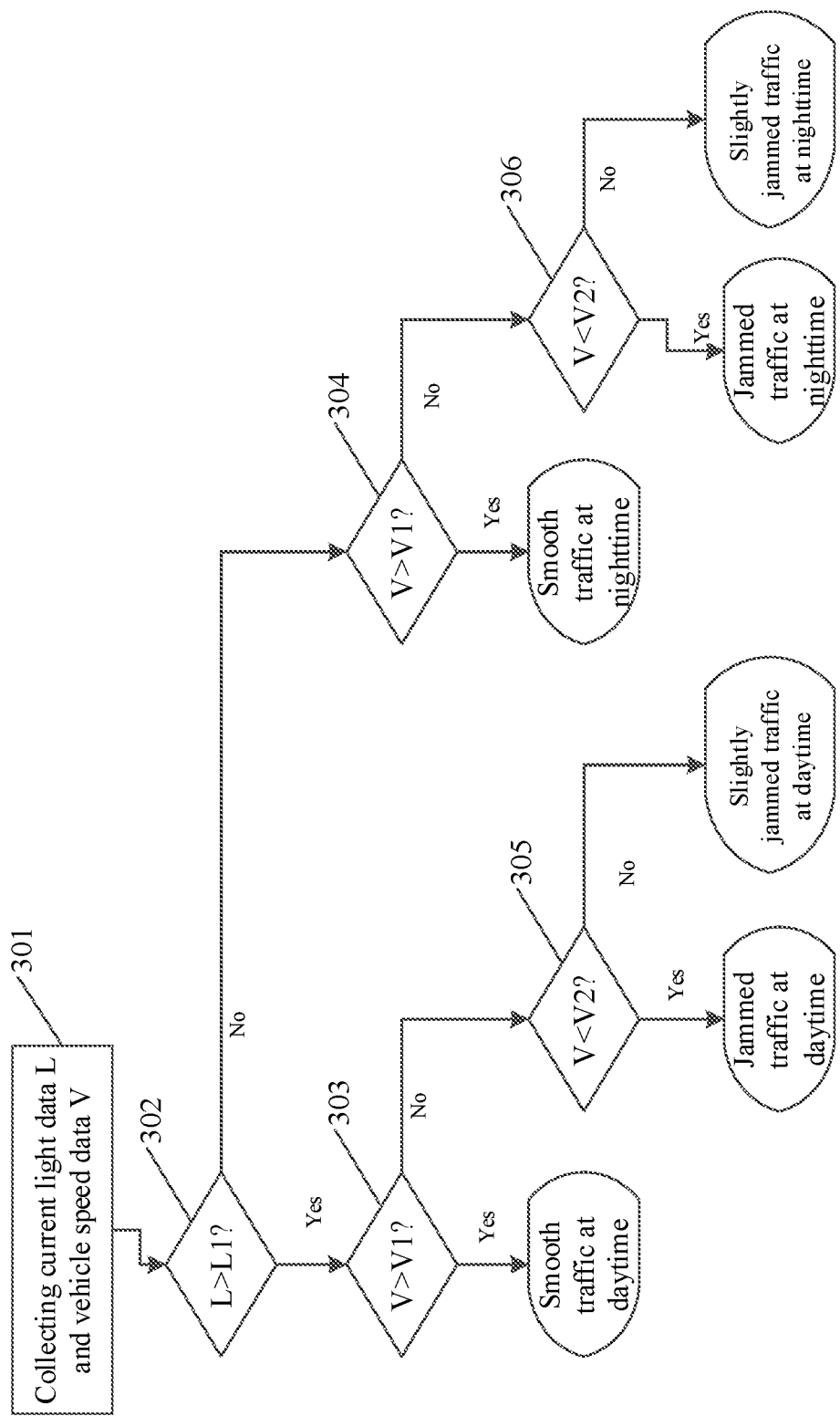
FIG. 3 is a second specific flow diagram for automatically determining a driving scene of a vehicle provided by an embodiment of the present disclosure.

According to a second Example: as shown in FIG. 3, a specific process of automatically determining the driving scene of the vehicle includes the following operations:

At block 301: collecting current light data L and vehicle speed data V;

At block 302: L>L1? i.e., determining whether the current light data is greater than a light threshold; if yes, indicating it is at daytime, proceeding to block 303, otherwise, indicating it is at nighttime, proceeding to block 304;

At block 303: V>V1? i.e., determining whether the current vehicle speed data is greater than a first vehicle speed threshold; if yes, indicating smooth traffic at daytime, otherwise, proceeding to block 305;

At block 304: V>V1? i.e., determining whether the current vehicle speed data is greater than the first vehicle speed threshold, if yes, indicating smooth traffic at nighttime, otherwise, proceeding to block 306;

At block 305: V<V2? i.e., determining whether the current vehicle speed data is smaller than a second vehicle speed threshold; if yes, indicating a jammed traffic at daytime, otherwise, i.e., V2<V<V1, indicating slightly jammed traffic at daytime, herein V1>V2;

At block 306: V<V2? i.e., determining whether the current vehicle speed data is smaller than the second vehicle speed threshold, if yes, indicating jammed traffic at nighttime, otherwise, indicating slightly jammed traffic at nighttime.

In this way, compared with the first Example, the second Example involves more types of driving scenes, which facilitates better control on traveling of the vehicle.

The embodiments of the present disclosure are only intended to explain the principle, so the examples provided are relatively simple, that is, there are few collection components, and few thresholds are set for the same collection component. However, those skilled in the art can understand that far more collection components and thresholds can be set than in the embodiment according to the principle of the embodiments of the present disclosure. For example, collection components for collecting data such as temperature, humidity, wind force, rain and snow, and air pollution may also be added, which will not be described in detail herein.

Second Embodiment

Figure 4:
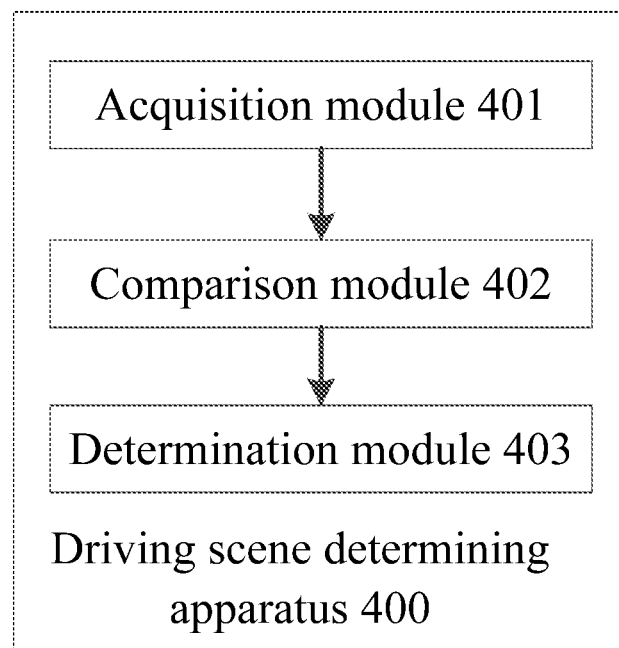
FIG. 4 is a structure diagram of a driving scene determining apparatus provided by an embodiment of the present disclosure.

The second embodiment provides a driving scene determining apparatus, and as shown in FIG. 4, the driving scene determining apparatus 400 includes an acquisition module 401, a comparison module 402 and a determination module 403, herein the acquisition module 401 is configured to acquire current driving data collected by a preset collection component;

the comparison module 402 is configured to compare the current driving data with a preset driving data threshold; and the determination module 403 is configured to determine a current driving scene according to a comparison result between the current driving data and the threshold.

In some other embodiments of the present disclosure, the acquisition module 401 is specifically configured to:

acquire current data of a light sensor on a vehicle.

In some other embodiments of the present disclosure, the acquisition module 401 is specifically configured to:

acquire current data of a vehicle speed sensor on the vehicle.

In some other embodiments of the present disclosure, the acquisition module 401 is specifically configured to:

acquiring current data of a positioning device of the vehicle.

The driving scene determining apparatus in the embodiment of the present disclosure may be an apparatus provided in a computer, or an independent apparatus connected with and communicating with a computer, or an apparatus provided in a cloud computer.

In some embodiments, the driving scene determining apparatus of the embodiment of the present disclosure may be used to execute the driving scene determining method described in the above embodiment, and of course, may also include a module configured to execute any process and/or operation in the driving scene determining method described in the above embodiment, which is not repeated herein for brevity.

The above description of the apparatus embodiment is similar to the above description of the method embodiment, and the apparatus embodiment has similar beneficial effects as the method embodiment. To understand technical details not disclosed in the apparatus embodiment of the present disclosure, please refer to the description of the method embodiments.

The modules included in the embodiment of the present disclosure may be implemented by a processor in a computer; of course, the modules may also be implemented by a logic circuit in a computer; and during the implementation, the processor may be a central processing unit (CPU) or a microprocessor unit (MPU), a digital signal processor (DSP), a field programmable gate array (FPGA), or the like.

Third Embodiment

Figure 5:
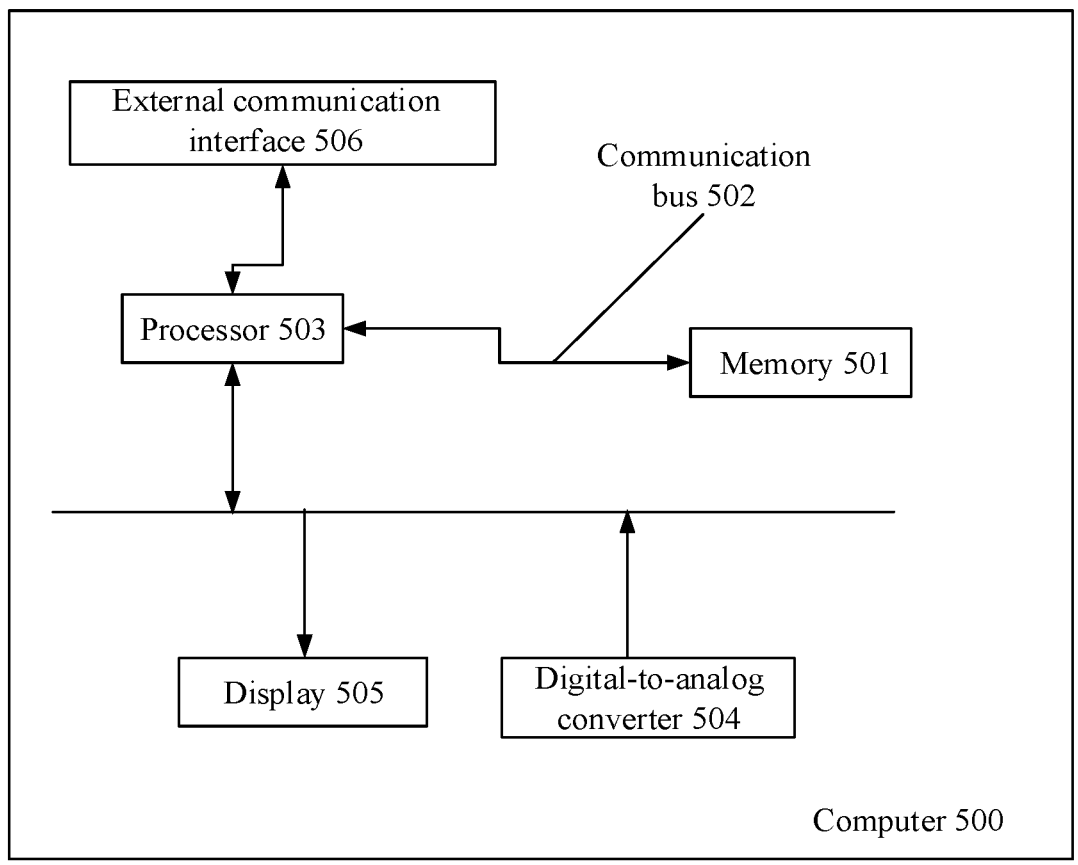
FIG. 5 is a structure diagram of a computer for determining a driving scene provided by an embodiment of the present disclosure.

The third embodiment provides a computer 500, and as shown in FIG. 5, the computer 500 includes a memory 501, a communication bus 502 and a processor 503, herein:

the memory 501 is configured to store a program of a driving scene determining method;

the communication bus 502 is configured to implement connection and communication between the memory and the processor; and the processor 503 is configured to execute the program of the driving scene determining method stored in the memory, to implement the method as described in the first Embodiment.

Specifically, the processor 503 may be a multi-core processor based on a reduced instruction set computer (RISC) architecture; and the memory 501 may be a high-capacity magnetic memory.

Specifically, the computer 500 further includes: an analog-to-digital converter 504, a display 505, and an external communication interface 506, herein:

the analog-to-digital converter 504 is configured to convert an analog signal collected by the collection component into a digital signal and transmit the digital signal to the processor 503. Specifically, a digital-to-analog conversion component may be integrated or separate. The term "separate" means that each collection component corresponds to one digital-to-analog converter. For example, a light sensor corresponds to a light digital-to-analog converter. In addition, some collection components originally collect digital signals, and thus do not need corresponding digital-to-analog conversion components.

The display 505 is configured to display a collected content and a determined driving scene type.

The external communication interface 506 may be configured to communicate with an external terminal. The external terminal includes a server or a client. The external communication interface 506 may include a wired interface and a wireless interface.

More specifically, the computer 500 may be a vehicle-mounted trip computer.

The above description of the computer embodiment is similar to the above description of the method embodiment, and the computer embodiment has similar beneficial effects as the method embodiment. To understand technical details not disclosed in the embodiment, please refer to the description of the method embodiments.

Fourth Embodiment

The fourth embodiment provides a computer readable storage medium. The computer readable storage medium stores an executable program which, when executed by a processor, implements the driving scene determining method as described in first Embodiment.

The computer readable storage medium may be a high-capacity magnetic memory.

The above description of the computer readable storage medium embodiment is similar to the above description of the method embodiment, and the computer embodiment has similar beneficial effects as the method embodiment. To understand technical details not disclosed in the computer readable storage medium of the embodiment, please refer to the description of the method embodiments.

Fifth Embodiment

Figure 6:
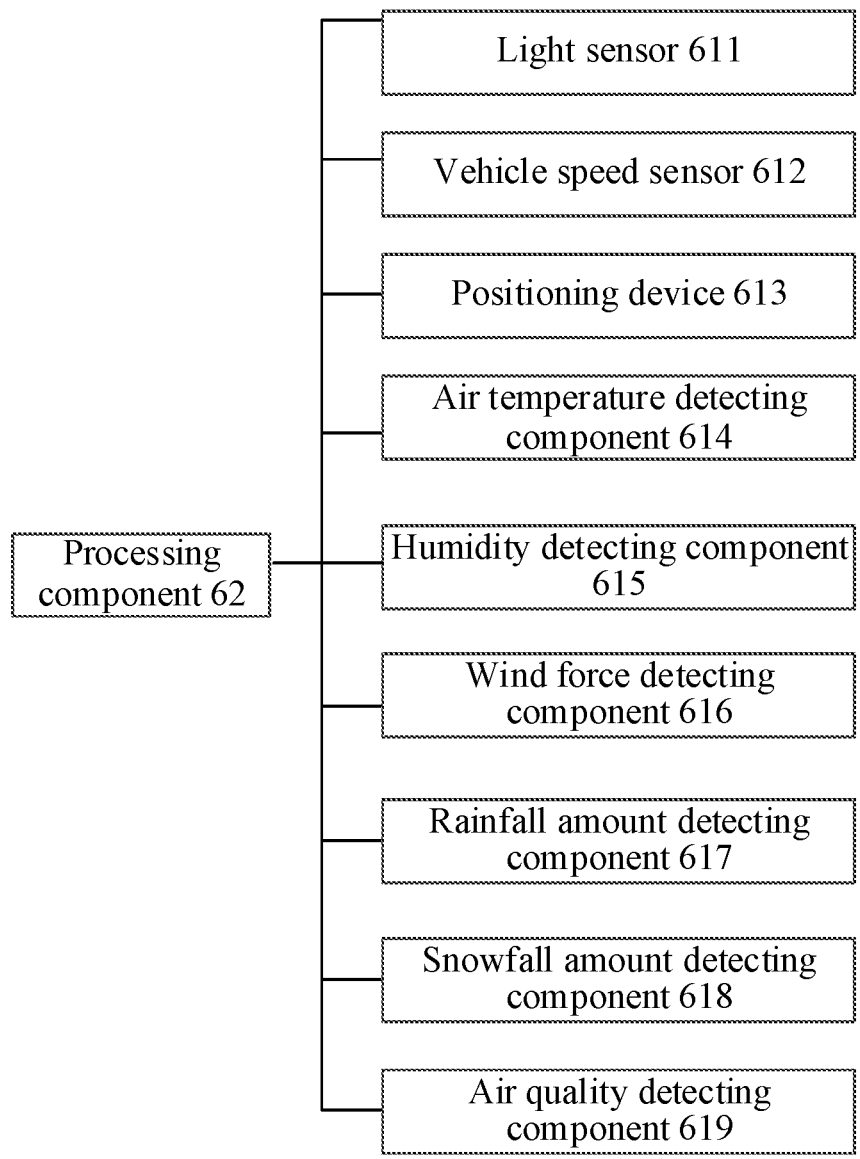
FIG. 6 is a schematic diagram of a driving scene determining system provided by an embodiment of the present disclosure.

The fifth embodiment provides a driving scene determining system, and as shown in FIG. 6, the system includes a collection component and a processing component 62, herein the collection component is configured to collect current driving data of a vehicle;

the processing component 62 is configured to acquire the driving data and determine a current driving scene according to the driving data; and the collection component includes a light sensor 611 which is electrically connected to the processing component 62.

The processing component 62 here is equivalent to the computer 500 in the third Embodiment.

In some other embodiments of the present disclosure, the collection component further includes a vehicle speed sensor 612, the vehicle speed sensor 612 being electrically connected to the processing component. In this way, it can be determined whether the current driving scene is in jammed traffic or smooth traffic, or whether it is on a lane or an expressway, etc. This is a better implementation.

In some other embodiments of the present disclosure, the collection component further includes a positioning device 613, the positioning device 613 being electrically connected to the processing component. In this way, it can be determined whether the current driving scene is in an urban area or in a suburban area. This is a better implementation.

In some other embodiments of the present disclosure, the collection component further includes an air temperature detecting component 614, the air temperature detecting component 614 being electrically connected to the processing component. As the temperature also influences key components of a vehicle, such as an engine, and a brake component, the temperature is also data that needs to be collected in a driving scene. This is a better implementation.

In some other embodiments of the present disclosure, the collection component further includes a humidity detecting device 615, the humidity detecting device 615 being electrically connected to the processing component. Like the air temperature detecting component, the humidity also influences the key components of the vehicle, and thus is also data that needs to be collected in a driving scene. This is a better implementation.

In some other embodiments of the present disclosure, the collection component further includes a wind force detecting component 616, the wind force detecting component 616 being electrically connected to the processing component. The magnitude of the wind force directly influences driving safety, and thus is also data that needs to be collected in a driving scene. This is a better implementation.

In some other embodiments of the present disclosure, the collection component further includes a rainfall amount detecting device 617, the rainfall amount detecting device 617 being electrically connected to the processing component. A rainfall amount directly influences a driving speed and a braking mode, which is a better implementation method.

In some other embodiments of the present disclosure, the collection component further includes a snowfall amount detecting component 618, the snowfall amount detecting component 618 being electrically connected to the processing component. Like the rainfall amount, the snowfall amount directly influences the driving speed and the braking mode. This is a better implementation.

In some other embodiments of the present disclosure, the collection component further includes an air quality detecting component 619, the air quality detecting component 619 being electrically connected to the processing component. When the air quality is poor, it needs to close vehicle windows, adjust a ventilation mode, etc. This is a better implementation.

Sixth Embodiment

The embodiment provides a vehicle including a wheel rotation imaging apparatus and the driving scene determining system described in the fifth Embodiment, herein the wheel rotation imaging apparatus is electrically connected to the driving scene determining system; and the wheel rotation imaging apparatus works according to a driving scene determined by the driving scene determining system.

The wheel rotation imaging system uses a technology that can display video in real time during wheel rotation, may be an advertising carrier, and may also be used for other purposes.

However, the implementation of the wheel rotation imaging system requires a certain vehicle speed range and a certain light range, and may be not available if the vehicle speed is too slow or too fast and if the light is too bright. The driving scene determining system may just monitor the vehicle speed and other scenes in real time, so the two wheel rotation imaging system and the driving scene determining system may be combined. That is, if the driving scene determining system determines that the driving scene is at nighttime or it is cloudy, and the vehicle speed is not too fast, a set video can be automatically played without manual operation. Furthermore, the wheel rotation imaging system needs to be charged, and the timing of charging may also be determined according to the driving scene determining system. For example, wheel rotation imaging system may be charged when the vehicle is traveling, and cannot be charged when the vehicle is stationary.

It should be noted that as used herein, the terms "comprise", "include" or any other variants are intended to cover non-exclusive inclusion, such that a process, method, article or apparatus that comprises a series of elements includes not only those elements, but also other elements not explicitly listed, or inherent elements of such a process, method, article or apparatus. In the absence of more limitations, an element defined by the expression "comprising one . . . " does not exclude the presence of other identical elements in the process, method, article or device including the element.

It should be noted that in the disclosure of the embodiments of the present disclosure, unless otherwise described and defined, the term "connection" should be understood in a broad sense, for example, may be an electrical connection, or communication within two components, and may be a direct connection, or indirect connection through an intermediate medium. For those of ordinary skill in the art, the specific meaning of the above terms can be understood according to specific circumstances.

It should be noted that the terms "first/second/third", if involved in the embodiments of the present disclosure, only distinguish similar objects, but do not represent a particular sequence of the objects. Understandably, the terms "first/second/third" may be interchanged in the specific sequence or order if allowed.

It should be understood that "an embodiment" or "some embodiments" mentioned throughout the specification means that a particular feature, structure, or characteristic related to the embodiments is included in at least one embodiment of the present disclosure. Therefore, the expression "in an embodiment" or "in some embodiments" in various places throughout the specification does not necessarily refer to the same embodiment. In addition, these particular features, structures or characteristics may be combined in one or more embodiments in any suitable manner. It should be understood that in various embodiments of the present disclosure, the sequence numbers of the above processes do not indicate an execution sequence, and the execution sequence of each process should be determined by its function and internal logic, and should not constitute any limitation on the implementation process of the embodiments of the present disclosure. The sequence numbers of the above embodiments of the present disclosure are only for description, and do not represent the degree of superiority of the embodiments.

In the several embodiments provided in the present disclosure, it should be understood that the disclosed apparatuses and methods can be implemented in other manners. The apparatus embodiments described above are merely illustrative. For example, the modules may be separated only based on a logical function, and may be separated by other manners in actual implementations. For example, multiple modules or components may be combined or may be integrated into another system, or some features may be ignored or may not be executed. In addition, the mutual coupling or direct coupling or communicative connection between components as shown or discussed may be through some interfaces, or may be direct coupling or communicative connection between apparatuses or modules, and may be in an electrical, mechanical or other form.

The above modules described as separate components may or may not be physically separate, and components displayed as modules may or may not be physical modules; the modules may be located in one place or distributed on multiple network modules; and some or all of the modules may be selected according to actual needs to achieve the objective of the solutions of the embodiments.

In addition, the functional modules in the embodiments of the present disclosure may be integrated into one processing module, or each functional module may be individually used as a module respectively, or two or more than two functional modules may be integrated into one module; and the above integrated module may be implemented in the form of hardware or in the form of a hardware and software functional module.

Those of ordinary skill in the art can understand that all or part of the operations in the above method embodiment may be implemented by hardware related to program instructions. The above program may be stored in a computer readable storage medium. When the program is executed, the operations of the above method embodiment are executed; and the above storage medium includes: a portable storage device, a read only memory (ROM), a random access memory (RAM), a magnetic disk or optical disk, or any of various media capable of storing program codes.

Alternatively, the above integrated module in the present disclosure may also be stored in a computer readable storage medium if implemented in the form of a software functional module and sold or used as a separate product. Based on such understanding, the technical solutions of the embodiments of the present disclosure, in essence or for the part contributing to the prior art, may be embodied in the form of a software product, and the computer software product is stored in a storage medium, and includes a number of instructions configured to cause an electronic device (which may be a personal computer, a server, a network device or the like) to execute all or part of the methods described in the embodiments of the present disclosure. The above storage medium includes: a portable storage device, an ROM, an RAM, a magnetic disk, an optical disk or any of other various media that can store program codes. Thus, the embodiments of the present disclosure are not limited to any particular combination of hardware and software.

Described above are only preferred embodiments of the present disclosure, rather than limiting the protection scope of the present disclosure. All modifications, equivalent substitutions, improvements or the like made within the spirit and principle of the present disclosure should be encompassed within the protection scope of the present disclosure.

The invention claimed is:

1. A driving scene determining method, implemented by a computer including a collection component and a processing component, the driving scene determining method comprising:
 collecting, by the collection component, current driving data of a vehicle, wherein the collection component comprises a light sensor and a vehicle speed sensor, each of the light sensor and the vehicle speed sensor is electrically connected to the processing component;
 acquiring, by the processing component, the current driving data collected by the collection component;
 comparing, by the processing component, the current driving data with a preset driving data threshold; and determining, by the processing component, a current driving scene according to a comparison result between the current driving data and the preset driving data threshold, wherein the current driving scene is used by a wheel rotation imaging apparatus to determine whether a working condition of the wheel rotation imaging apparatus is met, and when it is determined that the current driving scene meets the working condition, the wheel rotation imaging apparatus automatically displays a video on a wheel in real time.

2. The method according to claim 1, wherein acquiring, by the processing component, the current driving data collected by the collection component comprises:

acquiring current data of the light sensor on the vehicle, and acquiring current data of the vehicle speed sensor on the vehicle.

3. The method according to claim 2, wherein acquiring, by the processing component, the current driving data collected by the collection component further comprises:

acquiring current data of a positioning device of the vehicle.

4. A driving scene determining apparatus, comprising:

a processor; and a memory storing instructions executable by the processor, wherein the processor is configured to:

acquire current driving data collected by a collection component, wherein the collection component comprises a light sensor and a vehicle speed sensor, each of the light sensor and the vehicle speed sensor is electrically connected to the processor;

compare the current driving data with a preset driving data threshold; and determine a current driving scene according to a comparison result between the current driving data and the preset driving data threshold, wherein the current driving scene is used by a wheel rotation imaging apparatus to determine whether a working condition of the wheel rotation imaging apparatus is met, and when it is determined that the current driving scene meets the working condition, the wheel rotation imaging apparatus automatically displays a video on a wheel in real time.

5. A vehicle, comprising a wheel rotation imaging apparatus and a driving scene determining system, wherein the wheel rotation imaging apparatus and the driving scene determining system are electrically connected;

the driving scene determining system comprises a collection component and a processing component, wherein the collection component is configured to collect current driving data of the vehicle;

the processing component is configured to acquire the current driving data and determine a current driving scene according to the current driving data; and the collection component comprises a light sensor and a vehicle speed sensor, each of the light sensor and the vehicle speed sensor is electrically connected to the processing component, the wheel rotation imaging apparatus determines, according to the current driving scene determined by the driving scene determining system, whether a working condition of the wheel rotation imaging apparatus is met, and the wheel rotation imaging apparatus is configured to automatically display a video on a wheel in real time in response to determining that the current driving scene meets the working condition.

6. The vehicle according to claim 5, wherein the light sensor is configured to collect light data of the current driving data, and the vehicle speed sensor is configured to collect vehicle speed data of the current driving data, and in response to the light data indicating that the current driving scene is at nighttime or is cloudy, and the vehicle speed data indicating that a vehicle speed is within a preset threshold range, the wheel rotation imaging apparatus automatically displays the video on the wheel in real time.

* * * * *